US010662564B2

(12) United States Patent
Yokoyama et al.

(10) Patent No.: US 10,662,564 B2
(45) Date of Patent: May 26, 2020

(54) SEWING MACHINE AND NON-TRANSITORY COMPUTER-READABLE MEDIUM

(71) Applicant: BROTHER KOGYO KABUSHIKI KAISHA, Nagoya-shi, Aichi-ken (JP)

(72) Inventors: Aki Yokoyama, Nagakute (JP); Tsuneo Okuyama, Inabe-gun (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 138 days.

(21) Appl. No.: 16/041,406

(22) Filed: Jul. 20, 2018

(65) Prior Publication Data
US 2018/0327951 A1 Nov. 15, 2018

Related U.S. Application Data

(63) Continuation of application No. PCT/JP2017/000991, filed on Jan. 13, 2017.

(30) Foreign Application Priority Data

Jan. 29, 2016 (JP) .................................. 2016-015361

(51) Int. Cl.
*D05B 19/10* (2006.01)
*D05B 19/06* (2006.01)
(Continued)

(52) U.S. Cl.
CPC ........... *D05B 19/105* (2013.01); *D05B 19/06* (2013.01); *D05B 19/08* (2013.01); *D05B 19/14* (2013.01);
(Continued)

(58) Field of Classification Search
CPC ...... D05B 19/105; D05B 19/00; D05B 19/10; D05B 19/06; D05B 19/08; D05B 19/12;
(Continued)

(56) References Cited

U.S. PATENT DOCUMENTS 5,765,496 A * 6/1998 Futamura ............... D05B 19/08
112/102.5
5,782,189 A * 7/1998 Hirata .................. G05B 19/106
112/102.5
(Continued)

FOREIGN PATENT DOCUMENTS

JP H09-132860 A 5/1997
JP 2003-079978 A 3/2003
(Continued)

OTHER PUBLICATIONS

Apr. 18, 2017 International Search Report issued in International Patent Application No. PCT/JP2017/000991.

*Primary Examiner* — Ismael Izaguirre
(74) *Attorney, Agent, or Firm* — Oliff PLC

(57) ABSTRACT

A sewing machine acquires a selected pattern that is selected from among a plurality of embroidery patterns. The sewing machine displays a pattern image representing the selected pattern. The sewing machine identifies a specified position indicated by the instruction. The sewing machine determines, when the selected pattern is acquired a plurality of times, whether one of a plurality of the pattern images is displayed at the identified specified position. When it is determined that the pattern image is displayed at the identified specified position, the sewing machine identifies the selected pattern for which the pattern image is displayed at the specified position as the editing target. When it is not determined that the pattern image is displayed at the identified specified position, the sewing machine identifies the selected pattern for which a mask region encompassing the selected pattern is set at the specified position as the editing target.

10 Claims, 9 Drawing Sheets

(51) Int. Cl.
 *D05B 19/08* (2006.01)
 *D05B 19/14* (2006.01)
 *D05B 69/20* (2006.01)
 *D05C 5/04* (2006.01)
 *G05B 19/408* (2006.01)
 *G05B 19/4093* (2006.01)

(52) U.S. Cl.
 CPC ............... *D05B 69/20* (2013.01); *D05C 5/04* (2013.01); *G05B 19/4086* (2013.01); *G05B 19/40935* (2013.01); *D05D 2205/085* (2013.01); *D05D 2205/18* (2013.01); *G05B 2219/2626* (2013.01); *G05B 2219/45195* (2013.01)

(58) Field of Classification Search
 CPC ........ D05B 19/14; D05B 19/16; D05B 19/02; D05B 19/04; D05B 69/20; D05B 11/00; G05B 19/4086; G05B 19/40935; G05B 19/40933; G05B 2219/26; G05B 2219/45195; G05B 2219/45196; D05D 2205/18; D05D 2205/085; D05D 2305/36; D05C 5/04; D05C 5/02; D05C 5/06
 See application file for complete search history.

(56) References Cited

U.S. PATENT DOCUMENTS

| | | | | |
|---|---|---|---|---|
| 5,855,176 | A * | 1/1999 | Takenoya | D05B 19/08 |
| | | | | 112/102.5 |
| 5,954,004 | A * | 9/1999 | Futamura | D05B 19/105 |
| | | | | 112/102.5 |
| 6,006,686 | A * | 12/1999 | Hamajima | D05B 19/105 |
| | | | | 112/102.5 |
| 6,131,526 | A * | 10/2000 | Iida | D05B 19/10 |
| | | | | 112/102.5 |
| 6,237,516 | B1 * | 5/2001 | Wakayama | D05B 19/105 |
| | | | | 112/102.5 |
| 6,256,551 | B1 * | 7/2001 | Muto | D05B 19/08 |
| | | | | 112/102.5 |
| 7,991,500 | B2 * | 8/2011 | Roos | D05B 19/08 |
| | | | | 112/102.5 |
| 2007/0234204 | A1 | 10/2007 | Kobashi | |
| 2011/0146553 | A1 * | 6/2011 | Wilhelmsson | D05B 19/10 |
| | | | | 112/475.19 |

FOREIGN PATENT DOCUMENTS

| | | |
|---|---|---|
| JP | 2007-054110 A | 3/2007 |
| JP | 2007-279831 A | 10/2007 |

* cited by examiner

SEWING MACHINE AND NON-TRANSITORY COMPUTER-READABLE MEDIUM

CROSS-REFERENCE TO RELATED APPLICATION

This application is a Continuation Application of International Application No. PCT/JP2017/000991, filed Jan. 13, 2017, which claims priority from Japanese Patent Application No. 2016-015361, filed on Jan. 29, 2016. This disclosure of the foregoing application is hereby incorporated by reference in its entirety.

BACKGROUND

The present disclosure relates to a sewing machine and a non-transitory computer-readable medium.

In related art, a sewing machine is known that is provided with a display portion and an input portion and that is capable of performing embroidery sewing. The sewing machine of the related art displays a pattern to be sewn on the display portion. The sewing machine can edit the displayed pattern in accordance with operations on the input portion by a user.

SUMMARY

In the sewing machine of the related art, sufficient consideration has not been given to operability when editing a pattern obtained by combining a plurality of patterns.

An object of the present disclosure is to provide a sewing machine that improves operability when editing a pattern obtained by combining a plurality of patterns, and a non-transitory computer-readable medium.

Various embodiments herein provide a sewing machine including a display portion configured to display an image, an input portion configured to input an instruction to select a particular specified position on the display portion, a processor and a memory. The memory is configured to store computer-readable instructions. When executed by the processor, the computer-readable instructions instruct the processor to perform processes. The processes include acquiring a selected pattern that is selected from among a plurality of embroidery patterns. The processes further include displaying, on the display portion, a pattern image representing the selected pattern. The processes further include identifying the specified position indicated by the instruction when the instruction is input by the input portion. The processes further include determining, when a plurality of the pattern images are displayed on the display portion, whether one of the plurality of the pattern images is displayed at the identified specified position. When it is determined that the pattern image is displayed at the identified specified position, the sewing machine identifies the selected pattern for which the pattern image is displayed at the specified position as an editing target from among the plurality of selected patterns. When it is not determined that the pattern image is displayed at the identified specified position, the sewing machine identifies the selected pattern for which a mask region encompassing the selected pattern is set at the specified position as the editing target. editing the identified editing target.

Various embodiments also provide a non-transitory computer-readable medium storing computer-readable instructions that are executed by a processor provided in a sewing machine. When executed by the processor, the computer-readable instructions instruct the processor to perform processes. The processes include acquiring a selected pattern that is selected from among a plurality of embroidery patterns; The processes further include displaying, on a display portion, a pattern image representing the selected pattern. The processes further include identifying, when an instruction is input by the input portion to select a particular specified position on the display portion, the specified position indicated by the instruction. The processes further include determining, when a plurality of the pattern images are displayed on the display portion, whether one of the plurality of the pattern images is displayed at the identified specified position. When it is determined that the pattern image is displayed at the identified specified position, the sewing machine identifies the selected pattern for which the pattern image is displayed at the specified position as an editing target from among the plurality of selected patterns. When it is not determined that the pattern image is displayed at the identified specified position, the sewing machine identifies the selected pattern for which a mask region encompassing the selected pattern is set at the specified position as the editing target and editing the identified editing target.

BRIEF DESCRIPTION OF THE DRAWINGS

Embodiments of the disclosure will be described below in detail with reference to the accompanying drawings in which.

DETAILED DESCRIPTION

First and second embodiments of the present disclosure will be explained in order, with reference to the drawings. A physical configuration that is common to a multi-needle sewing machine (hereinafter simply referred to as a sewing machine) 1 according to the first and second embodiments will be explained with reference to FIG. 1. In the explanation below, the upper side, the lower side, the lower left side, the upper right side, the upper left side and the lower right side of FIG. 1 respectively correspond to the upper side, the lower side, the front side, the rear side, the left side and the right side of the sewing machine 1.

Figure 1:
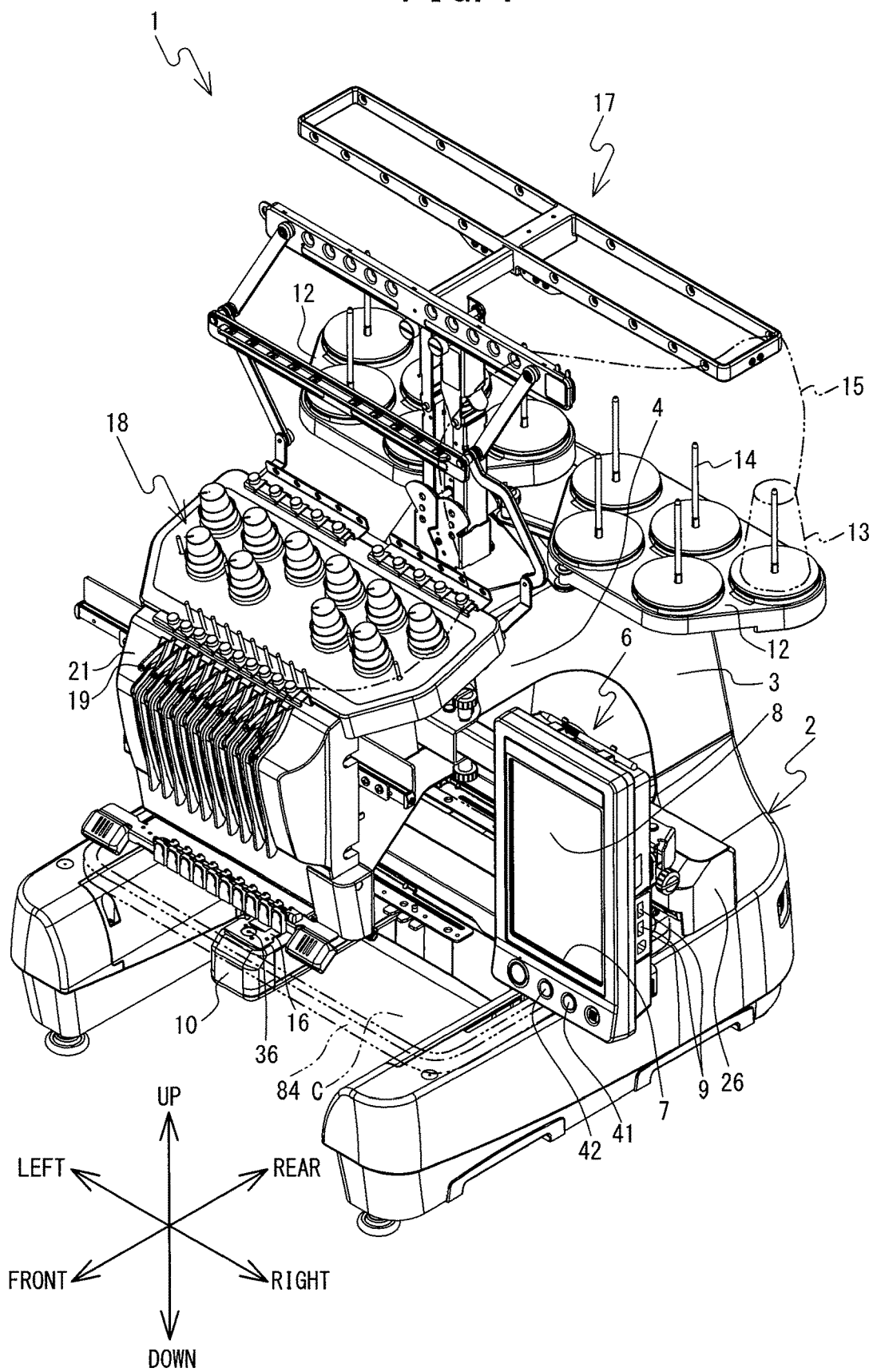
FIG. 1 is a perspective view of a multi-needle sewing machine.

As shown in FIG. 1, the sewing machine 1 is provided with a support portion 2, a pillar 3 and an arm portion 4. The support portion 2 supports the whole of the sewing machine 1. The pillar 3 is provided so as to extend upward from the rear end portion of the support portion 2. The arm portion 4 extends to the front from the upper end portion of the pillar 3. A needle bar case 21 is mounted on the tip end of the arm portion 4 such that the needle bar case 21 can move in the left-right direction. Ten needle bars 31 (refer to FIG. 2), which extend in the up-down direction, are disposed inside the needle bar case 21 at equal intervals in the left-right direction. Of the ten needle bars 31, the needle bar (a sewing needle bar) that is in a sewing position is caused to slide in the up-down direction by a needle bar drive mechanism 32 (refer to FIG. 2). A sewing needle (not shown in the drawings) can be mounted on the lower end of the needle bar 31. A presser foot (not shown in the drawings) intermittently presses a sewing object C (a work cloth, for example) downward, in concert with the up and down movement of the needle bar 31.

An operation portion 6 is provided on the arm portion 4. The operation portion 6 is provided with a liquid crystal display (LCD) 7, a touch panel 8, a connector 9, a start/stop switch 41, and a threading switch 42. Various types of information are displayed on the LCD 7. The various types of information include an operation image used when a user inputs a command, for example. The touch panel 8 receives the command from the user. The user performs a pressing operation, using a finger or a touch pen, on sections of the touch panel 8 that correspond to positions of input keys etc. displayed on the LCD 7. By the pressing operation, the user can select or set a sewing pattern and various conditions, such as sewing conditions. The pressing operation on the touch panel 8 performed by the user using the finger or the touch pen is hereinafter referred to as a "panel operation." The connector 9 is a USB standard connector and can be connected to a USB device 160 (refer to FIG. 2). The start/stop switch 41 is used to issue a command to start or stop sewing. Sewing is started if the start/stop switch 41 is pressed when sewing is stopped. Sewing is stopped if the start/stop switch 41 is pressed when sewing is being performed.

A cylinder-shaped cylinder bed 10, which extends to the front from the lower end portion of the pillar 3, is provided below the arm portion 4. A shuttle (not shown in the drawings) is provided inside the leading end portion of the cylinder bed 10. The shuttle houses a bobbin (not shown in the drawings) on which a lower thread (not shown in the drawings) is wound. A shuttle drive mechanism (not shown in the drawings) is provided inside the cylinder bed 10. The shuttle drive mechanism (not shown in the drawings) rotatably drives the shuttle. A needle plate 16 having a rectangular shape in a plan view is provided on the upper surface of the cylinder bed 10. The needle plate 16 is provided with a needle hole 36 through which the sewing needle (refer to FIG. 2) passes. Of the ten needle bars 31, the needle bar 31 positioned directly above the needle hole 36 is the sewing needle bar.

A Y carriage 26 of an embroidery frame movement mechanism 11 (refer to FIG. 2) is provided below the arm portion 4. The embroidery frame movement mechanism 11 detachably supports an embroidery frame 84. The embroidery frame 84 holds the sewing object C. Driving sources of the embroidery frame movement mechanism 11 are an X-axis motor 132 (refer to FIG. 2) and a Y-axis motor 134 (refer to FIG. 2). The embroidery frame movement mechanism 11 can move the embroidery frame 84 mounted on the Y carriage 26 to positions indicated using a unique XY coordinate system (an embroidery coordinate system). In the embroidery coordinate system, for example, the right direction, the left direction, the front direction and the rear direction of the sewing machine 1 are, respectively, the positive X direction, the negative X direction, the negative Y direction and the positive Y direction.

A pair of left and right thread spool bases 12 are provided on the back surface side of the upper surface of the arm portion 4. Five thread spool pins 14 are provided on each of the thread spool bases 12. The thread spool pins 14 extend in the up-down direction. The thread spool pins 14 support thread spools 13. The number of the thread spools 13 that can be mounted on the pair of the thread spool bases 12 is ten, which is the same as the number of the needle bars 31. Upper threads 15 are supplied from the thread spools 13 mounted on the thread spool bases 12. Each of the upper threads 15 is supplied, via a thread passage, to a needle hole (not shown in the drawings) of each of the sewing needles attached to the lower end of each of the needle bars 31. The thread passage includes a thread guide 17, a tensioner 18, and a thread take-up lever 19.

Figure 2:
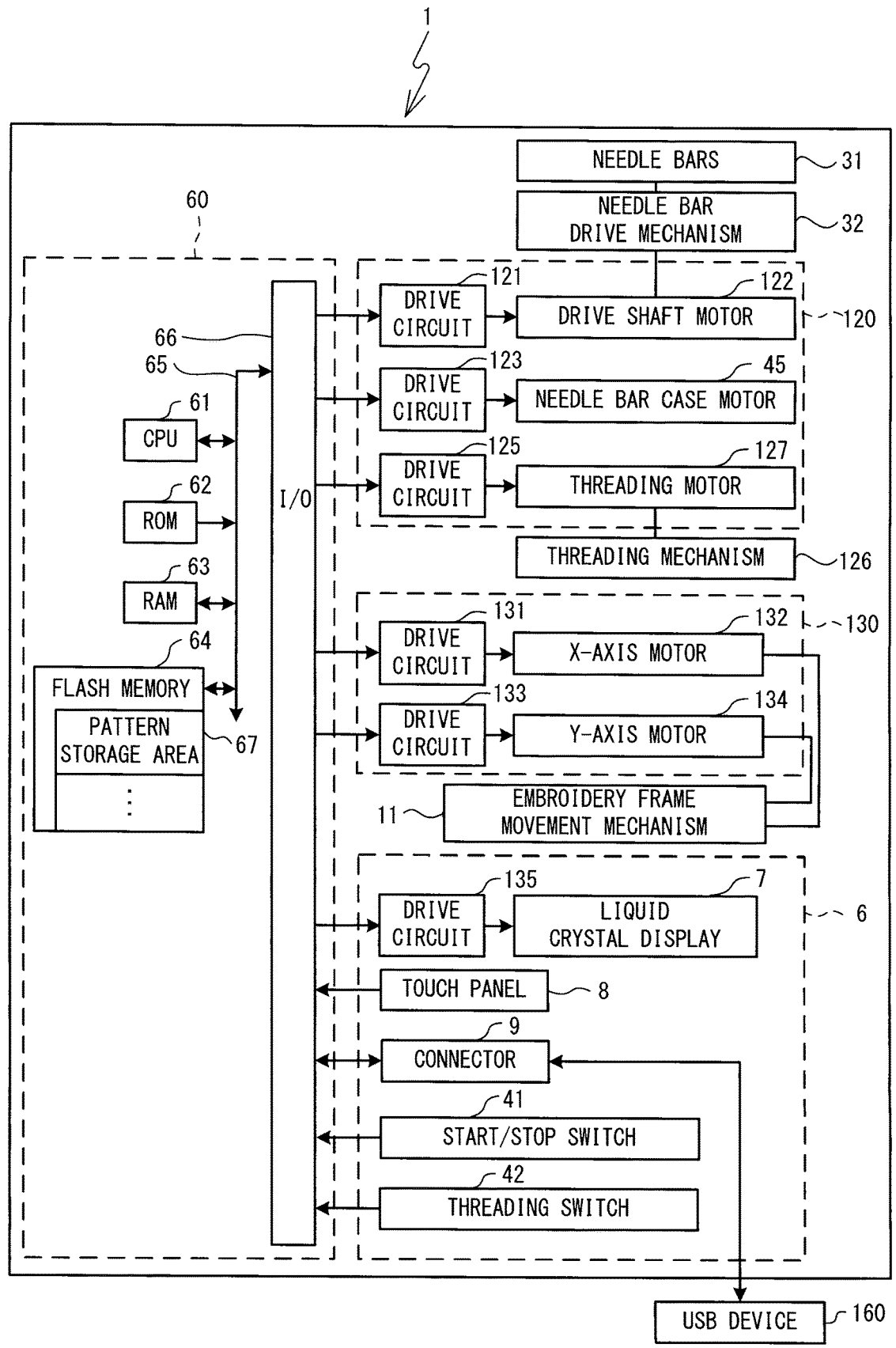
FIG. 2 is a block diagram showing an electrical configuration of the multi-needle sewing machine.

An electrical configuration that is common to and performs overall control of the sewing machine 1 of the first and second embodiments will be explained with reference to FIG. 2. As shown in FIG. 2, the sewing machine 1 is provided with a needle drive portion 120, a sewing target drive portion 130, the operation portion 6, and a control portion 60.

The needle drive portion 120 is provided with drive circuits 121, 123 and 125, a drive shaft motor 122, a needle bar case motor 45 and a threading motor 127. The drive shaft motor 122 drives the needle bar drive mechanism 32 and causes the sewing needle bar to reciprocate in the up-down direction. The drive circuit 121 drives the drive shaft motor 122 in accordance with a control signal from the control portion 60. The needle bar case motor 45 causes the needle bar case 21 to move in the left-right direction. The drive circuit 123 drives the needle bar case motor 45 in accordance with a control signal from the control portion 60. The threading motor 127 drives a threading mechanism 126. The drive circuit 125 drives the threading motor 127 in accordance with a control signal from the control portion 60.

The sewing target drive portion 130 is provided with drive circuits 131 and 133, the X-axis motor 132 and the Y-axis motor 134. The X-axis motor 132 drives the embroidery frame movement mechanism 11 and causes the embroidery frame 84 mounted on the Y carriage 26 to move in the left-right direction. The drive circuit 131 drives the X-axis motor 132 in accordance with a control signal from the control portion 60. The Y-axis motor 134 drives the embroidery frame movement mechanism 11 and causes the embroidery frame 84 to move in the front-rear direction. The drive circuit 133 drives the Y-axis motor 134 in accordance with a control signal from the control portion 60.

The operation portion 6 is provided with the touch panel 8, the connector 9, a drive circuit 135, the LCD 7, the start/stop switch 41, and the threading switch 42. The drive circuit 135 drives the LCD 7 in accordance with a control signal from the control portion 60. The connector 9 is connected to the USB device 160. For example, a PC and a USB memory can be used as the USB device 160.

The control portion 60 is provided with a CPU 61, a ROM 62, a RAM 63, a flash memory 64 and an input/output interface (I/O) 66, which are mutually connected by a bus 65. The needle drive portion 120, the sewing target drive portion 130, and the operation portion 6 are further connected to the input/output interface 66.

The CPU 61 performs main control of the sewing machine 1. The CPU 61 performs various arithmetic operations and processing that relate to sewing, in accordance with various programs stored in a program storage area (not shown in the drawings) of the ROM 62. The ROM 62 is provided with a plurality of storage areas (not shown in the drawings), including the program storage area (not shown in the drawings). Various programs to operate the sewing machine 1 are stored in the program storage area. The various programs include a main program (a sewing data editing program). The main program is a program to perform main processing, which will be described later. The RAM 63 is a storage element that is freely readable and writable. The RAM 63 includes, as necessary, a storage area to store operation results etc. processed by the CPU 61. The flash memory 64 is a readable and writable storage element. Various parameters for the sewing machine 1 to perform various types of processing are stored in the flash memory 64. The flash memory 64 includes a pattern storage area 67. The sewing data to sew patterns that can be sewn by the sewing machine 1 are stored in the pattern storage area 67 for each of a plurality of patterns. The sewing data includes stitch data for each of thread color data. The thread color data indicates the color of the thread that is used to form the stitches. The stitch data indicates, using coordinates of the embroidery coordinate system, positions (needle drop positions) at which stitches included in the embroidery pattern are formed. Specifically, the sewing data includes data indicating the formation positions of the stitches, for each color of the stitches.

Operations to form the stitches on the sewing object C held by the embroidery frame 84 will be explained with reference to FIG. 1 and FIG. 2. The embroidery frame 84 that holds the sewing object C is supported by the embroidery frame movement mechanism 11. One of the ten needle bars 31 is selected as the sewing needle bar, by the needle bar case 21 moving to the left and to the right. The embroidery frame 84 is moved to a predetermined position by the embroidery frame movement mechanism 11. When a drive shaft (not shown in the drawings) is rotationally driven by the drive shaft motor 122, the needle bar drive mechanism 32 and a thread take-up lever drive mechanism (not shown in the drawings) are driven, and the selected needle bar 31 and the thread take-up lever 19 corresponding to the selected needle bar 31 are vertically up and down. The shuttle drive mechanism is driven by rotation of the drive shaft motor 122, and the shuttle is rotationally driven. The sewing needle, the thread take-up lever 19, and the shuttle are driven in a synchronized manner, and the stitches are formed on the sewing object C.

An overview will be explained of main processing that can be performed by the sewing machine 1. The user can select the embroidery pattern to be sewn, from among the plurality of embroidery patterns stored in the pattern storage area 67 of the flash memory 64. The user selects the specific embroidery pattern from among the plurality of embroidery patterns by operating the touch panel 8. The CPU 61 acquires a selected pattern that has been selected from among the plurality of embroidery patterns stored in the pattern storage area 67. The CPU 61 displays a pattern image representing the selected pattern on the LCD 7. The pattern image has the same shape as the selected pattern. For example, when the selected pattern is circular, the shape of the pattern image is also circular. The CPU 61 receives editing of the selected pattern. When the user selects a plurality of embroidery patterns as the selected patterns, the CPU 61 identifies one, as an editing target, from among the plurality of selected patterns. The CPU 61 edits the identified editing target in accordance with editing commands from the user. For example, the user operates the touch panel 8 and inputs a command specifying a particular position. The CPU 61 identifies the specified position indicated by the command. The CPU 61 identifies the selected pattern that is the editing target from among the plurality of selected patterns, on the basis of the specified position. Specifically, the CPU 61 determines whether one of the plurality of pattern images displayed on the LCD 7 is being displayed in the specified position. When the CPU 61 determines that the pattern image is being displayed in the specified position, from among the plurality of selected patterns, the CPU 61 identifies, as the editing target, the selected pattern for which the pattern image is displayed in the specified position. When the CPU 61 does not determine that the pattern image is being displayed in the specified position, the CPU 61 identifies, as the editing target, the selected pattern for which a mask region is set in the specified position. The mask region is, for example, a region of a predetermined shape that encompasses the selected pattern (the pattern image). The CPU 61 edits the identified editing target in accordance with commands.

The main processing of the first embodiment will be explained with reference to FIG. 3 to FIG. 7. The main processing is activated when the user inputs a command to start processing to select or edit the embroidery pattern to be sewn. When the CPU 61 detects the command, the CPU 61 reads out the main program stored in the program storage area of the ROM 62 and stores the main program in the RAM 63. The CPU 61 performs the following steps, in accordance with instructions included in the main program stored in the RAM 63. The various parameters, such as threshold values and the like, needed to perform the main processing are stored in the flash memory 64. The various data obtained in the course of the main processing is stored as necessary in the RAM 63.

Figure 3:
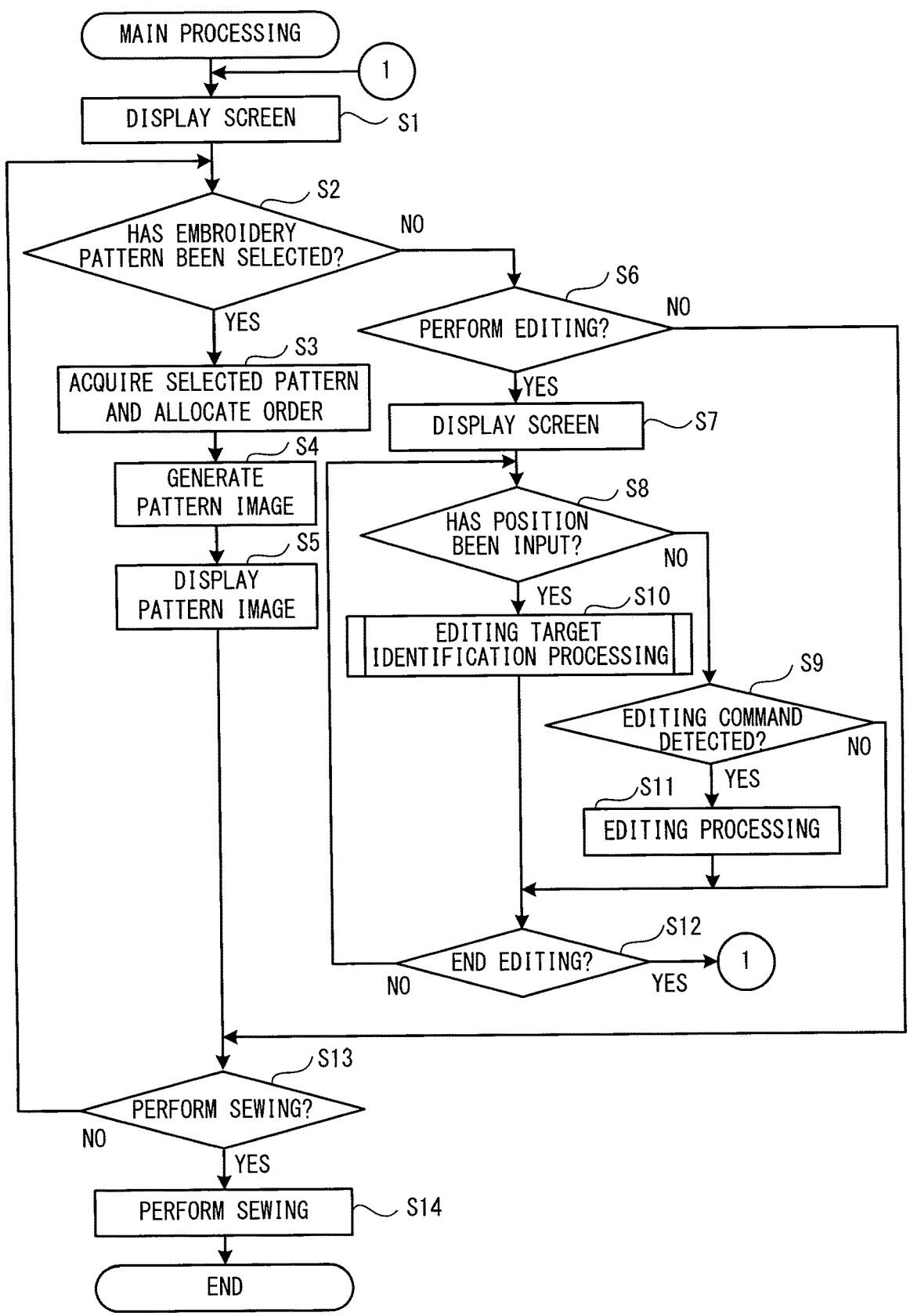
FIG. 3 is a flowchart of main processing.
Figure 4:
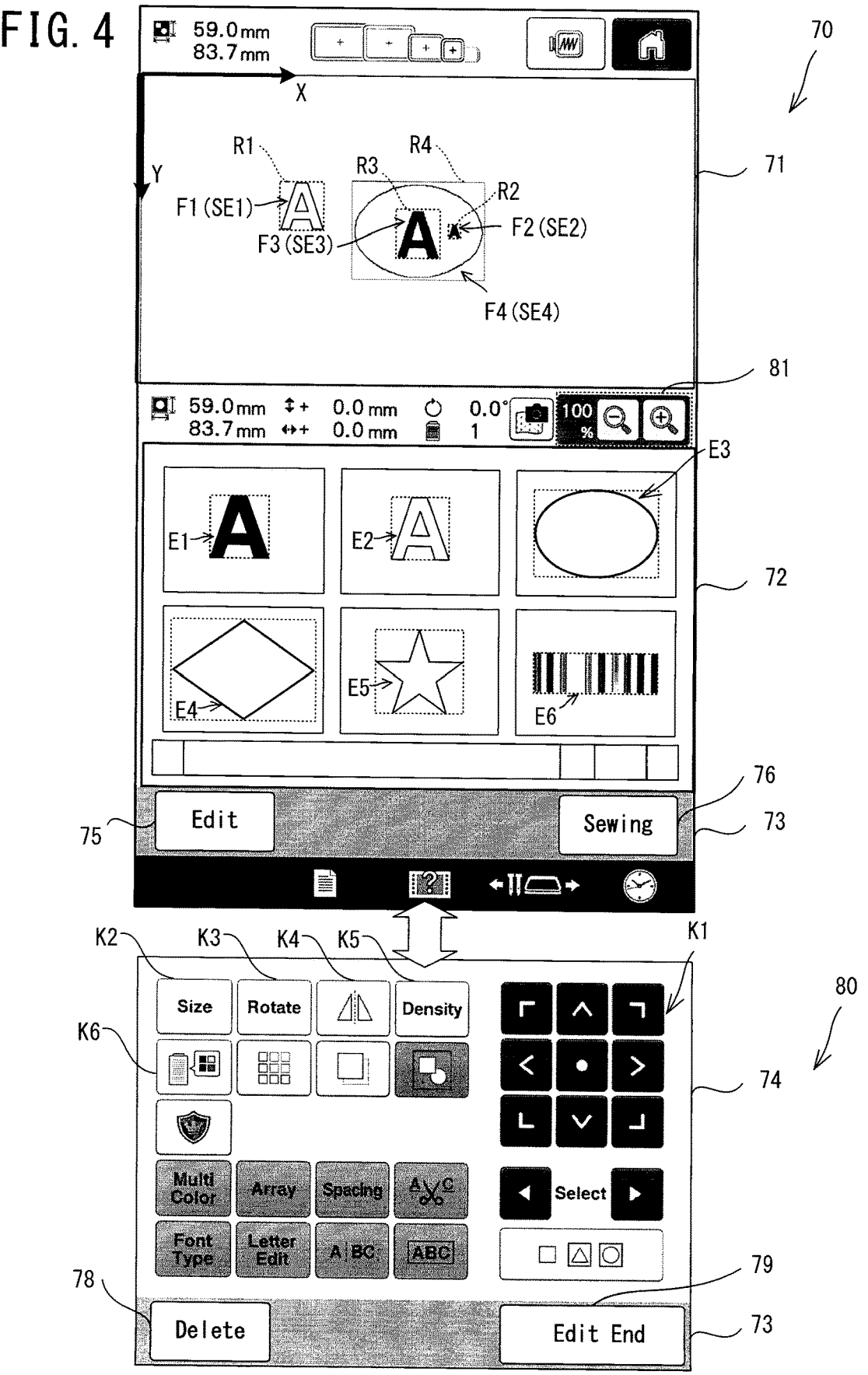
FIG. 4 is an explanatory diagram of a screen displayed on a liquid crystal display.

As shown in FIG. 3, the CPU 61 displays a screen 70 shown in FIG. 4 on the LCD 7 (step S1). As shown in FIG. 4, the screen 70 includes fields 71 to 73. The pattern image representing the selected pattern selected by the user is displayed in the field 71. Coordinates of an image coordinate system are set in the field 71 in FIG. 4. The X axis direction of the image coordinate system is the left-right direction in FIG. 4. The X axis direction of the image coordinate system corresponds to an X direction of the embroidery coordinate system. The Y axis direction of the image coordinate system is the up-down direction in FIG. 4. The Y axis direction of the image coordinate system corresponds to a Y axis of the embroidery coordinate system. A size and layout of the pattern image in the field 71 represents a size and layout when the selected pattern corresponding to the pattern image is sewn on the sewing object C. Keys 81 are displayed underneath the field 71. The keys 81 are keys for inputting commands to change a display magnification of the selected pattern displayed in the field 71. A plurality of the pattern images representing candidates of the embroidery pattern to be sewn are displayed in the field 72. The pattern images are images representing the plurality of embroidery patterns stored in the pattern storage area 67 of the flash memory 64, and are displayed on the basis of the sewing data. The pattern images of embroidery patterns E1 to E6 are respectively displayed in the field 72. The embroidery patterns E1 and E2 are patterns representing the alphabetic letter "A," sewn in a thread of one color. Predetermined stitches are formed inside a contour line of the embroidery pattern E1. The predetermined stitches are not formed inside a contour line of the embroidery pattern E2. The embroidery pattern E3 is an elliptical frame-shaped pattern, sewn in a thread of one color. The embroidery pattern E4 is a diamond frame-shaped pattern, sewn in a thread of one color. The embroidery pattern E5 is a star-shaped pattern, sewn in a thread of one color. The embroidery pattern E6 is sewn using threads of ten colors. The embroidery pattern E6 is a pattern obtained by combining ten line-shaped partial patterns that extend in the up-down direction in FIG. 4. By selecting one of the pattern images of the plurality of embroidery patterns displayed in the field 72, the user can select, as the selected pattern, the embroidery pattern to be sewn using the sewing machine 1, from among the plurality of embroidery patterns stored in the pattern storage area 67. Keys 75 and 76 are displayed in the field 73. The key 75 is a key for inputting a command to start the processing to edit the selected pattern. The key 76 is a key for inputting a command to start the sewing. The keys displayed in the field 73 can be switched in accordance with content displayed in the other fields.

The CPU 61 determines whether the input of the command to select the embroidery pattern has been detected (step S2). When the user has performed an operation (1) to select a location at which the embroidery pattern E2 is displayed, the CPU 61 detects that the command to select the embroidery pattern E2 has been input (yes at step S2). In this case, the CPU 61 acquires, as a selected pattern SE1, the embroidery pattern E2 indicated by the detected command, and allocates an order of display M on the LCD 7 (step S3). An initial value of the order of display M is 1. The CPU 61 sets the order of display M in an order of selection. The smaller the value of the order of display M, the further the selected pattern is arranged to the rear of the screen 70. The larger the value of the order of display M, the further the selected pattern is arranged to the forefront of the screen 70.

The CPU 61 generates the pattern image representing the selected pattern SE1 acquired by the processing at step S3 (step S4). The CPU 61 generates the pattern image (pattern image data) in which stitches included in the selected pattern are represented by line segments of a predetermined thickness, on the basis of the sewing data of the selected pattern acquired by the processing at step S3. Specifically, the CPU 61 determines a color of the line segments representing the stitches, on the basis of the thread color data included in the sewing data. The CPU 61 determines relative positions of start points and end points of the line segments representing the stitches, on the basis of the stitch data included in the sewing data. The pattern image may be any image that can be displayed on the LCD 7. For example, the pattern image is a PNG format image formed from a plurality of pixels arranged in a matrix shape. The pattern image includes sections representing the stitches included in the selected pattern, and does not include pixels that do not represent the stitches included in the selected pattern. The pixels that do not represent the stitches included in the selected pattern are caused to be transparent. The size and shape of the field 71 when the display magnification is 100% represents the size and shape of a sewable area set inside the embroidery frame 84. The sewable area is an area in which the stitches can be formed. The CPU 61 sets the size of the pattern image in accordance with the size of the field 71, the resolution of the LCD 7, and the size of the selected pattern. The CPU 61 displays the pattern image generated at step S4, in the field 71 of the screen 70 (step S5). The CPU 61 arranges a pattern image F1 in the field 71 (711) of the screen 70, such that a center of a mask region R1 of the pattern image F1 generated at step S4 is aligned with a center of the field 71. The mask region R1 is a minimum rectangle encompassing the selected pattern SE1. The mask region R1 has two sides parallel to the left-right direction of the LCD 7, corresponding to the X axis of the embroidery coordinate system. The mask region R1 has two sides parallel to the up-down direction of the LCD 7, corresponding to the Y axis of the embroidery coordinate system. When the selected pattern is newly arranged in the field 71, the CPU 61 identifies the newly arranged selected pattern as the editing target. The selected pattern SE1 identified as the editing target is displayed such that a color of the contour line of the mask region R1 of the corresponding pattern image F1 is a particular color (red, for example). Specifically, the selected pattern identified as the editing target is distinguished from the other selected patterns by a display mode of the contour line of the mask region. The user can recognize which of the selected patterns is the current editing target by the display mode of the contour line of the mask region. The user can ascertain the size of the selected pattern in relation to the sewable area, from the size of the pattern image in relation to the field 71.

The CPU 61 determines whether the input of a sewing start command has been detected (step S13). The sewing start command is input by selecting the key 76 by the panel operation, for example. When the input of the sewing start command has not been detected (no at step S13), the CPU 61 returns the processing to step S2. When the input of the sewing start command has been detected (yes at step S13), the CPU 61 sews the selected pattern displayed in the field 71 on the sewing object C held by the embroidery frame 84, using the layout displayed in the field 71 (step S14). When the sewing of the selected pattern ends, the CPU 61 ends the main processing.

In the processing at step S2, when the command to select the embroidery pattern has not been detected (no at step S2), the CPU 61 determines whether an input of an editing command has been detected (step S6). The CPU 61 determines that the input of the editing command has been detected when it has been detected that the key 75 has been selected. When the input of the editing command has not been detected (no at step S6), the CPU 61 performs the above-described processing at step S13. When the user selects the key 75 by the panel operation, the CPU 61 detects the input of the editing command (yes at step S6). In this case, the CPU 61 displays a screen 80 on the LCD 7 (step S7). The screen 80 is a screen on which, of the screen 70, the field 72 is changed to a field 74, and the keys 75 and 76 of the field 73 are changed to keys 78 and 79. Although not shown in FIG. 4, the screen 80 includes the same field 71 as the screen 70. Keys K1 to K6 that are used to input commands to edit the editing target are displayed in the field 74. The key K1 is a key for inputting a command to change the layout of the editing target. The key K2 is a key for inputting a command to change the size of the editing target. The key K3 is a key for inputting a command to rotate the editing target. The key K4 is a key for inputting a command to left-right invert the editing target. The key K5 is a key for inputting a command to change a thread density of the editing target. The key K6 is a key for inputting a command to change the thread color of the editing target. The key 78 is a key for inputting a command to delete the editing target. The key 79 is a key for inputting an editing end command.

The CPU 61 determines whether the command to select the particular display position in the field 71 has been detected (step S8). The sewing machine 1 can identify the selected pattern that is to be the editing target, in accordance with the display position specified in the field 71. When the processing at step S3 to acquire the selected pattern has been performed a plurality of times, the plurality of pattern images are displayed in the field 71 of the LCD 7. There is a case in which the user wishes to change the selected pattern that is to be the editing target from a current editing target to another selected pattern. In this case, the user selects, by the panel operation, the display position in which the desired pattern image corresponding to the desired selected pattern is displayed, of the pattern images displayed in the field 71. When the command to select one of the display positions in the field 71 has not been detected (no at step S8), the CPU 61 determines whether the input of the editing command has been detected (step S9). The CPU 61 determines that the editing command has been input when it has been detected that one of the keys K1 to K6, or the key 78 has been selected (yes at step S9). For example, when an operation (2) has been performed by the user to select the key K1, the CPU 61 detects that the editing command has been input (yes at step S9). In this case, the CPU 61 performs the editing processing in accordance with commands input with respect to the editing target (step S11). The CPU 61 performs processing to change the layout of the editing target in a direction indicated by a command and by an amount indicated by a command, in accordance with the panel operation of the key K1. The CPU 61 displays the pattern image F1, for which the layout has been changed in accordance with the editing content, in the field 71 (712). The CPU 61 corrects the sewing data of the selected pattern in accordance with the editing content of the selected pattern.

At step S9, when the panel operation of the key K2 has been detected (yes at step S9), the CPU 61 displays a screen for specifying the size of the editing target, and performs processing to change the size of the editing target in accordance with commands input on the screen (step S11). When the panel operation of the key K3 has been detected (yes at step S9), the CPU 61 displays a screen for specifying a rotation direction and a rotation angle of the editing target. The CPU 61 performs processing to change an angle of the editing target in accordance with a command input on the screen (step S11). When the panel operation of the key K4 has been detected (yes at step S9), the CPU 61 performs processing to left-right invert the editing target (step S11). When the panel operation of the key K5 has been detected (yes at step S9), the CPU 61 displays a screen for specifying the thread density of the editing target. The CPU 61 performs processing, in accordance with a command input on the screen, to change the thread density of the editing target to a value indicated by the command (step S11). When the panel operation of the key K6 has been detected (yes at step S9), the CPU 61 displays a screen for specifying the thread color of the editing target. The CPU 61 performs processing to change the thread color of the editing target in accordance with a command input on the screen (step S11). When the panel operation of the key 78 has been detected (yes at step S9), the CPU 61 performs processing to delete the editing target (step S11). As described above, at step S11, the CPU 61 performs the correction or deletion of the pattern image of the editing target in accordance with the editing content, and updates the field 71. The CPU 61 corrects the sewing data of the editing target in accordance with the editing content. The CPU 61 advances the processing to step S12.

When the panel operation to select the particular position in the field 71 has been detected (yes at step S8), the CPU 61 performs editing target identification processing (step S10). At step S10, processing to identify the selected pattern that will be the editing target is performed on the basis of the position specified by the panel operation. The editing target identification processing will be described in detail later. The CPU 61 advances the processing to step S12. When the input of the command has not been detected (no at step S8; no at step S9), the CPU 61 advances the processing to step S12. The CPU 61 determines whether the input of the editing end command has been detected (step S12). The CPU 61 determines that the input of the editing end command has been detected when the selection of the key 79 has been detected. When the input of the editing end command has not been detected (no at step S12), the CPU 61 returns the processing to step S8. When the editing end command has been detected (yes at step S12), the CPU 61 returns the processing to step S1. At step S1, the CPU 61 displays the screen 70 on the LCD 7.

When the user has performed an operation (3) to select an embroidery pattern E1 in the field 72, the CPU 61 detects that the command to select the embroidery pattern E1 has been input (yes at step S2). In this case, the CPU 61 acquires the embroidery pattern E1 indicated by the detected command as a selected pattern SE2, and allocates 2 in the order of display M on the LCD 7 (step S3). The CPU 61 generates a pattern image F2 representing the acquired selected pattern SE2 (step S4). The CPU 61 displays the pattern image F2 generated at step S4 in the field 71 (713) (step S5).

Figure 5:
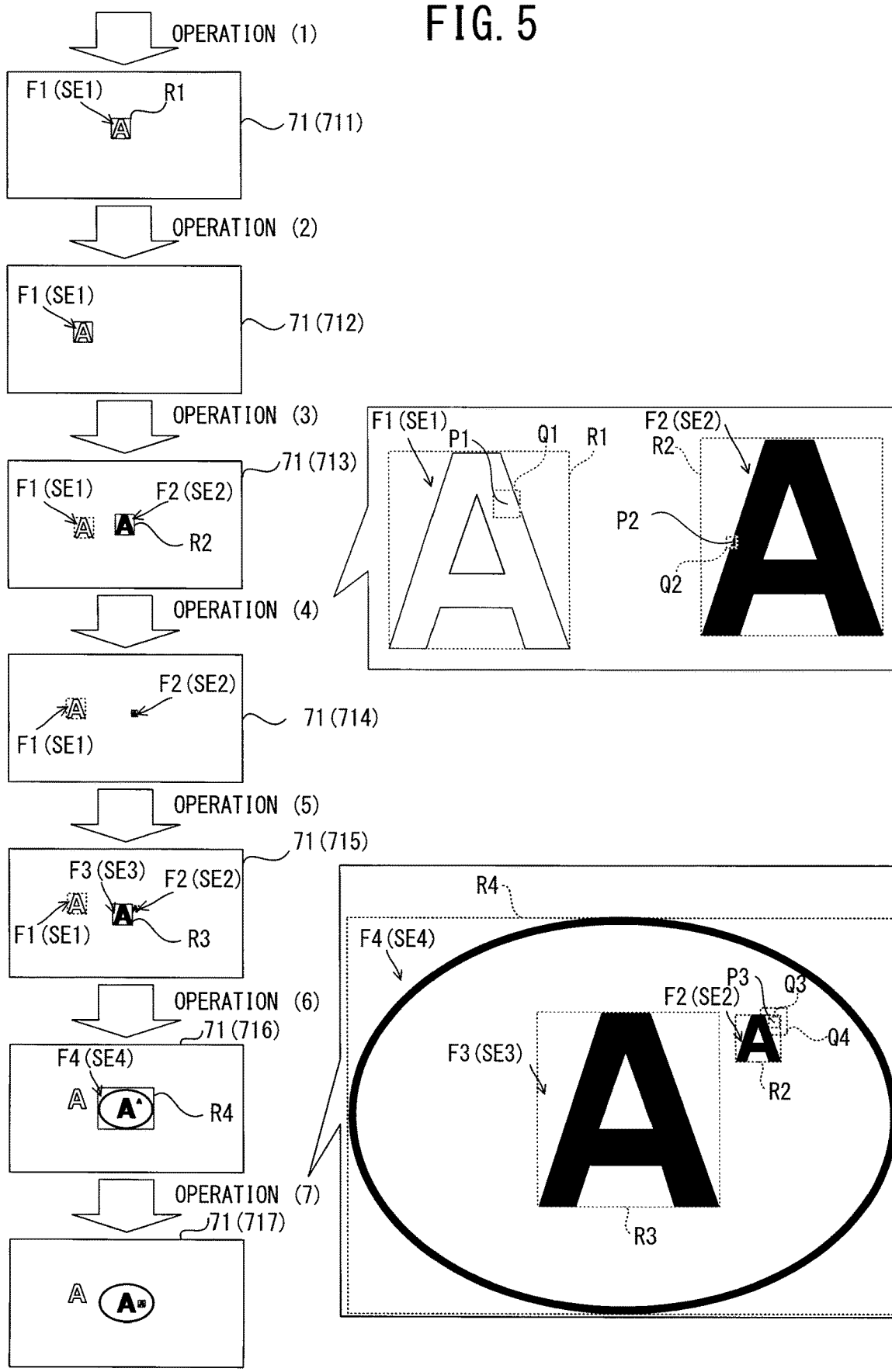
FIG. 5 is an explanatory diagram of a process to select and edit an embroidery pattern.
Figure 6:
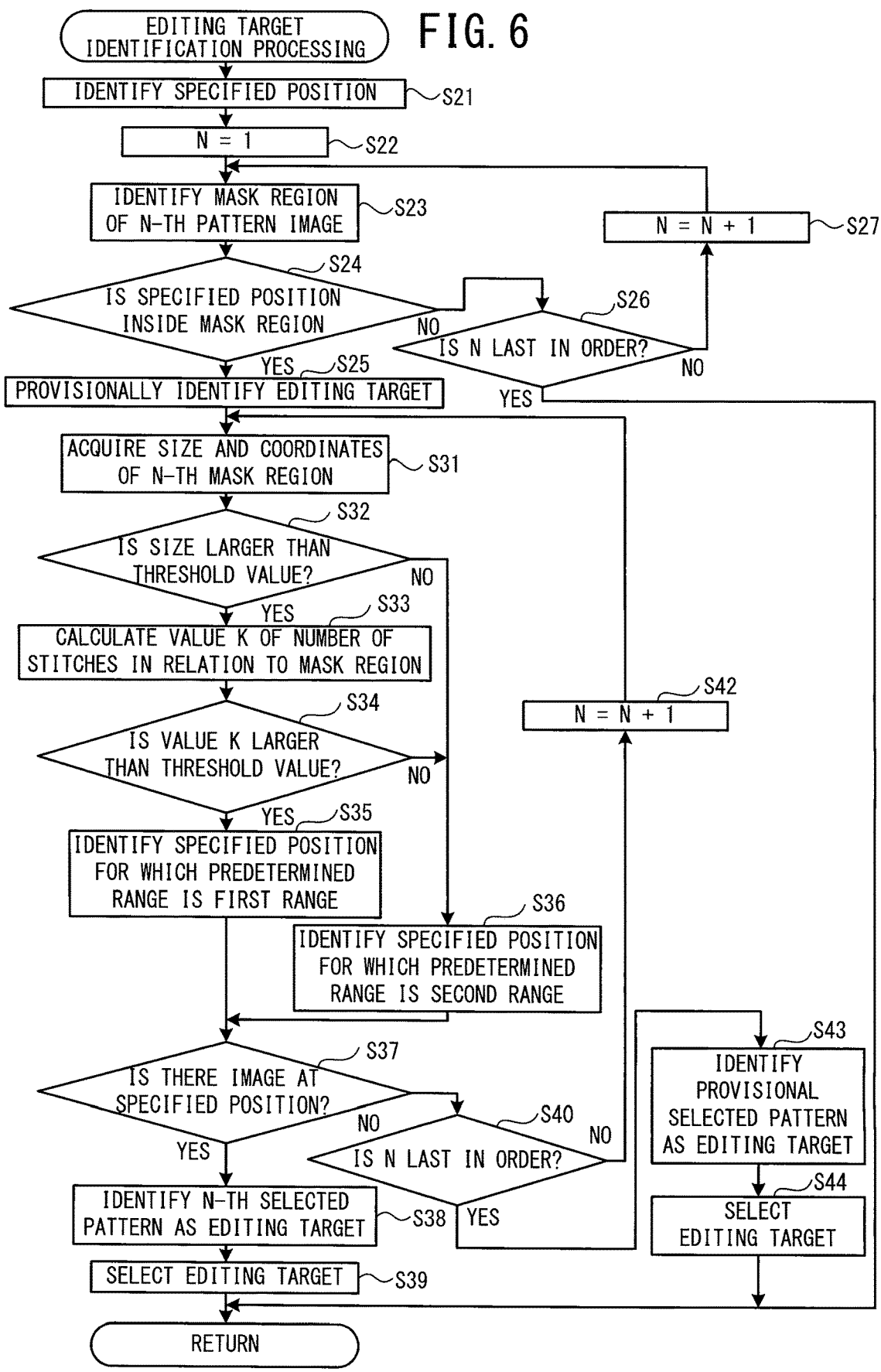
FIG. 6 is a flowchart of editing target identification processing performed in the main processing shown in FIG. 3.

When the user has performed an operation (4) to select, in order, the key 75, a point P1 (refer to FIG. 5), the key K1, a point P2 (refer to FIG. 5), the key K2, and the key K1, the CPU 61 detects the selection of the key 75 (yes at step S6) and displays the screen 80 on the LCD 7 (step S7). When the CPU 61 detects the selection of the point P1 inside the field 71 (yes at step S8), the CPU 61 performs the editing target identification processing (step S10). As shown in FIG. 6, in the editing target identification processing, the CPU 61 identifies the specified position on the basis of the display position of the point P1 in side the field 71 selected by the panel operation (step S21). The CPU 61 identifies, as the specified position, a predetermined range that includes the display position input using the touch panel 8. It is sufficient that the predetermined range at step S21 be set as appropriate, and in the present example, it is one dot of the LCD 7. At step S21, the CPU 61 identifies, as the specified position, the display position input using the touch panel 8 as it is. The CPU 61 identifies the display position of the point P1 using coordinates of the image coordinate system set in the field 71. The CPU 61 sets a variable N to 1 (step S22). The variable N is a variable used to acquire the pattern image of the selected pattern in accordance with a predetermined order (a call order). From among the plurality of pattern images arranged from the forefront of the screen to the rearmost position on the screen on the LCD 7, the CPU 61 identifies the selected pattern of the pattern image arranged furthest to the front as the editing target on a priority basis. In other words, the CPU 61 acquires the pattern images in order from the largest value of the order of display M allocated at step S3.

The CPU 61 acquires the pattern image representing the N-th selected pattern in the call order, and identifies the mask region of the N-th pattern image (step S23). When the variable N is 1, the CPU 61 identifies a mask region R2 of the pattern image F2 for which the order of display M is 2. The CPU 61 determines whether the specified position acquired at step S21 is inside the mask region R2 identified at step S23 (step S24). The point P1 shown in FIG. 5 is determined not to be inside the mask region R2 (no at step S24). The CPU 61 determines whether the variable N is the last in the call order (step S26). When the variable N is the last in the call order (yes at step S26), the CPU 61 ends the editing target identification processing without identifying the editing target on the basis of the position acquired at step S21, and returns the processing to the main processing in FIG. 3. In this case, the editing target is the selected pattern itself identified as the editing target at the point in time at which the processing at step S10 is started. In the specific example, it is determined that 1 is not the last in the call order (no at step S26). The CPU 61 increments the variable N (step S27) and returns the processing to step S23.

The CPU 61 acquires the pattern image F1 of the selected pattern SE1 that is second in the call order, and identifies the mask region R1 of the pattern image F1 (step S23). The CPU 61 determines that the point P1 is inside the mask region R1 (yes at step S24), and provisionally identifies the selected pattern SE1 as the editing target (step S25). The CPU 61 acquires the size and coordinates of the mask region of the N-th selected pattern in the call order (step S31). The size of the mask region is expressed as a length of sides of the rectangular mask region. The size of the mask region may be a surface area calculated on the basis of the coordinates of the image coordinate system for the mask region. The coordinates of the mask region are coordinates, of the image coordinate system, of a reference point of the mask region. The reference point may be set in advance and is, for example, the upper left side vertex of the rectangular mask region. The CPU 61 determines whether the size of the mask region R1 acquired at step S31 is larger than a threshold value (step S32). The threshold value at step S32 is set in advance while taking into account the size of the field 71 that displays the pattern image, the size of the embroidery frame 84 (the sewable area) that is to be used, the resolution of the LCD 7 and the like. When the size of the mask region is indicated using the length of the sides of the mask region, the threshold value at step S32 may be the length of at least one of a short side and a long side. In the present example, as an example, the threshold value of 20 dots is set for the length of the short sides of the mask region on the LCD 7, and is stored in the flash memory 64. When the size of the mask region R1 is equal to or less than the threshold value (no at step S32), the CPU 61 performs processing at step S36 to be described later. In the specific example, the CPU 61 determines that the size of the mask region R1 is larger than the threshold value (yes at step S32). Specifically, the CPU 61 determines that both the length in the X axis direction and the length in the Y axis direction of the mask region R1 on the LCD 7 are larger than the threshold value of 20 dots.

The CPU 61 calculates a value K representing a number of stitches in relation to the size of the mask region (step S33). The number of stitches is acquired from the sewing data corresponding to the N-th pattern image. The size of the mask region is in proportion to the size of the embroidery pattern. Thus, the value K is proportional to the number of stitches in relation to the size of the embroidery pattern. When the value K is larger, the number of stitches per unit area inside the mask region is large, in comparison to a case in which the value K is small. For example, the size of the mask regions of the selected patterns SE1 and SE2 in the field 713 are the same, but the value K is larger for the selected pattern SE2 than the selected pattern SE1. The CPU 61 determines whether the value K is larger than a threshold value (step S34). The threshold value at step S34 is set in advance while taking into account the size of the field 71 displaying the pattern image, the size of the embroidery frame 84 (the sewable area) to be used, the resolution of the LCD 7, the length of the stitches and the like. As an example, as the threshold value at step S34, a number of stitches per 25 dots on the LCD 7 is set as 1, and is stored in the flash memory 64. When it is determined that the value K is larger than the threshold value (yes at step S34), the CPU 61 identifies the specified position for which the predetermined range is a first range including the position acquired at step S21 (step S35). The first range of the present example is a 5-dot square-shaped range centering on a pixel in the position acquired at step S21. Specifically, the first range is a square-shaped range that has the pixel in the position acquired at step S21 at its center and that is expanded in increments of a first amount (2 dots) in each of the up-down direction (the Y axis direction of the image coordinate system) and the left-right direction (the X axis direction of the image coordinate system) in FIG. 5. The CPU 61 advances the processing to step S37.

In the pattern image F1, it is determined that the value K is equal to or less than the threshold value (no at step S34), and the CPU 61 identifies a specified position Q1 for which the predetermined range is a second range that is wider than the first range (step S36). The second range of the present example is an 11-dot square-shaped range centering on the pixel in the position acquired at step S21. Specifically, the second range is a square-shaped range that has the pixel in the position acquired at step S21 at its center and that is expanded in increments of a second amount (5 dots) that is larger than the first amount, in each of the up-down direction and the left-right direction in FIG. 5. The CPU 61 advances the processing to step S37.

The CPU 61 determines whether, inside the specified position identified at step S35 or step S36, there is an image representing stitches of the N-th pattern in the call order (more specifically, pixels representing the stitches, among the pixels configuring the pattern image) (step S37). The CPU 61 determines whether there is the image representing the stitches of the selected pattern inside the specified position on the basis of the coordinates of the reference point of the mask region acquired at step S31, and the stitch data of the sewing data of the N-th selected pattern. An image representing stitches of the selected pattern SE1 is included inside the specified position Q1, as shown in FIG. 5 (yes at step S37). In this case, the CPU 61 identifies the N-th selected pattern in the call order as the editing target (step S38). The CPU 61 selects the editing target identified at step S38 (step S39). The CPU 61 displays the contour line of the mask region R1 of the pattern image F1 in the field 71 using the particular color. The CPU 61 ends the editing target identification processing and returns the processing to the main processing in FIG. 3. When the image representing the stitches of the N-th selected pattern in the call order is not included inside the specified position (no at step S37), the CPU 61 determines whether the variable N is the last in the call order (step S40). When the variable N is not the last in the call order (no at step S40), the CPU 61 returns the processing to step S31 after incrementing the variable N (step S42). When the variable N is the last in the call order (yes at step S40), the CPU 61 identifies, as the editing target, the selected pattern provisionally identified in the processing at step S25 (step S43). The CPU 61 selects the editing target identified at step S43 (step S44). The CPU 61 ends the editing target identification processing and returns the processing to the main processing in FIG. 3.

When the user has selected the key K1, the CPU 61 detects that the editing command has been input (no at step S12; no at step S8; yes at step S9). The CPU 61 performs processing to change the layout of the selected pattern SE1 that is the editing target in the specified direction and by the specified amount (step S11). After that, in accordance with the selection of the point P2 by the user, the CPU 61 detects that the particular position in the field 71 has been input (no at step S12; yes at step S8). In the editing target identification processing (step S10), the CPU 61 identifies the mask region R2 of the pattern image F2 of the selected pattern SE2 that is first in the call order (step S23). The CPU 61 determines that the point P2 is inside the mask region R2 (yes at step S24), and provisionally identifies the selected pattern SE2 as the editing target (step S25). The CPU 61 acquires the size and coordinates of the mask region R2 (step S31). It is determined that the size of the mask region R2 is larger than the threshold value (yes at step S32) and the CPU 61 calculates the value K (step S33). It is determined that the value K is larger than the threshold value (yes at step S34). The CPU 61 identifies a specified position Q2 for which the predetermined range is the first range (step S35). The CPU 61 determines that there is an image representing stitches of the selected pattern SE2 inside the specified position Q2 (yes at step S37). The CPU 61 identifies the selected pattern SE2 as the editing target (step S38) and selects the editing target (step S39). In accordance with the selection of the key K2 by the user, the CPU 61 detects that the editing command has been input (no at step S12; no at step S8; yes at step S9). The CPU 61 performs processing to change the size of the selected pattern SE2 that is the editing target to the specified size (step S11). After that, when the user has selected the key K1, the CPU 61 detects that the editing command has been input (no at step S12, no at step S8, yes at step S9). The CPU 61 performs the processing to change the layout of the selected pattern SE2 that is the editing target in the specified direction and by the specified amount (step S11). When the operation (4) has been performed, the selected pattern is edited as displayed in the field 71 (714).

Figure 7:
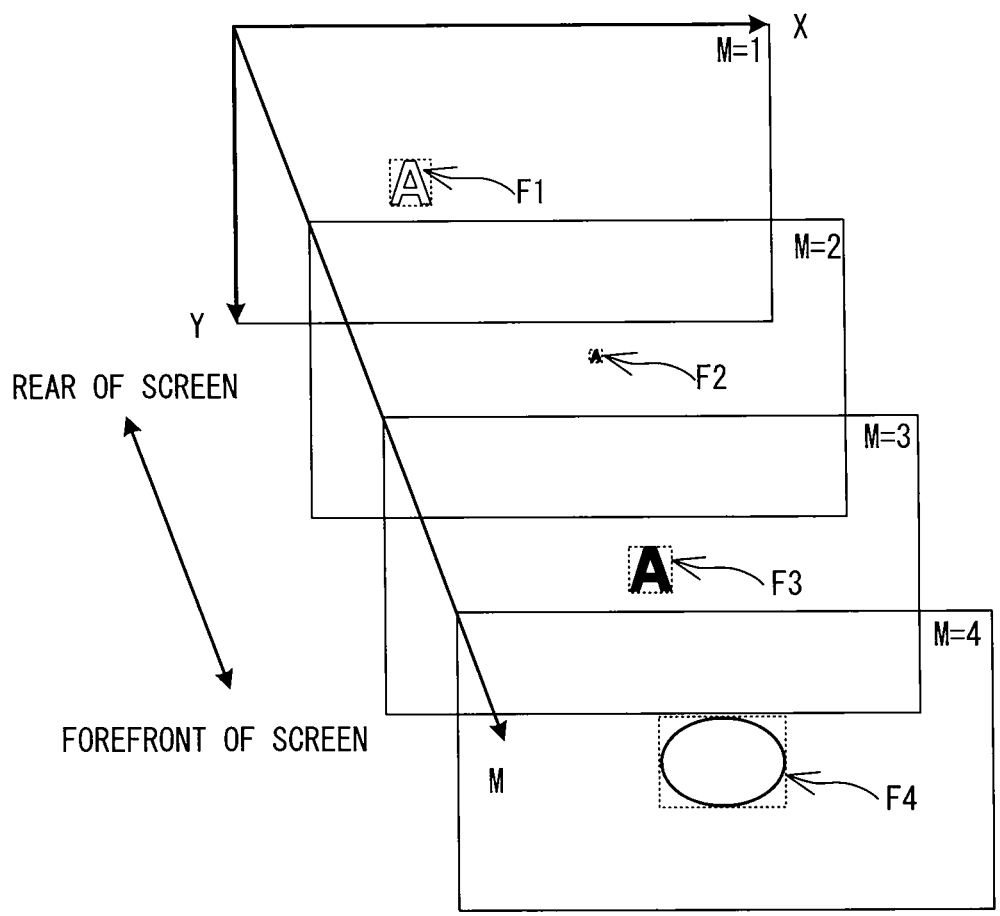
FIG. 7 is an explanatory diagram of an order of display of selected patterns.

Further, when the user has performed an operation (5) to select, in order, the key 79 and the embroidery pattern E1, the CPU 61 detects the editing end command (yes at step S12), and displays the screen 70 (step S1). The CPU 61 detects the selection of the embroidery pattern E1 (yes at step S2). The CPU 61 acquires, as a selected pattern SE3, the embroidery pattern E1 and allocates 3 in the order of display M to the selected pattern SE3 (step S3). The CPU 61 generates a pattern image F3 (step S4), and displays the pattern image F3 in the field 71 (715) (step S5). Further, when the user has performed an operation (6) to select the embroidery pattern E3, the CPU 61 detects the selection of the embroidery pattern E3 (no at step S13; yes at step S2). The CPU 61 acquires the embroidery pattern E3 as a selected pattern SE4, and allocates 4 as the order of display M (step S3). The CPU 61 generates a pattern image F4 (step S4) and displays the pattern image F4 in the field 71 (716) (step S5). The order of display of the four selected patterns is shown in FIG. 7. Specifically, the order of display of the four selected patterns is, from the rear side, the selected pattern SE1, the selected pattern SE2, the selected pattern SE3 and the selected pattern SE4.

Next, when the user performs an operation (7) to select, in order, the key 75, a point P3, and the key K1, the CPU 61 first displays the screen 80 on the LCD 7 (step S7) and detects the position input (yes at step S8). The CPU 61 identifies a mask region R4 of the pattern image F4 of the selected pattern SE4 that is first in the call order (step S23). The CPU 61 determines that the point P3 is inside the mask region R4 (yes at step S24), and acquires the size and coordinates of the mask region R4 (step S31). It is determined that the mask region R4 is larger than the threshold value (yes at step S32), and the CPU 61 calculates the value K (step S33). It is not determined that the value K is larger than the threshold value (no at step S34). The CPU 61 identifies a specified position Q4 for which the predetermined range is the second range (step S36). The CPU 61 determines that an image representing stitches of the selected pattern SE4 is not present inside the specified position Q4 (no at step S37). The CPU 61 increments the variable N (no at step S40; step S42), and returns the processing to step S31. The CPU 61 acquires the size and coordinates of a mask region R3 of the selected pattern SE3 that is second in the call order (step S31). It is determined that the mask region R3 is larger than the threshold value (yes at step S32), and the CPU 61 calculates the value K (step S33). It is determined that the value K is larger than the threshold value (yes at step S34). The CPU 61 identifies a specified position Q3 for which the predetermined range is the first range (step S35). The CPU 61 determines that an image representing stitches of the selected pattern SE3 is not present inside the specified position Q3 (no at step S37). The CPU 61 increments the variable N (no at step S40; step S42), and returns the processing to step S31.

The CPU 61 acquires the size and coordinates of the mask region R2 of the selected pattern SE2 that is third in the call order (step S31). It is not determined that the mask region R2 is larger than the threshold value (no at step S32). The CPU 61 identifies the specified position Q4 for which the predetermined range is the second range (step S36). The second range is the range that is wider than the first range. The CPU 61 determines that the image representing the stitches of the selected pattern SE2 is present in the specified position Q4 (yes at step S37). The CPU 61 identifies the selected pattern SE2 as the editing target (step S38), and selects the editing target (step S39). In accordance with the selection of the key K1 by the user, the CPU 61 detects that the editing command has been input (no at step S12; no at step S8; yes at step S9). The CPU 61 performs the processing to change the layout of the selected pattern SE2 that is the editing target in the specified direction and by the specified amount, and causes the changes to be reflected in the field 71 (717) (step S11).

When the user has selected the key 79, the CPU 61 detects the editing end command (yes at step S12) and returns the processing to step S1. When the user has selected the key 76, the CPU 61 detects the sewing command (yes at step S13). The CPU 61 sews the selected patterns SE1 to SE4 in that order, in accordance with the sizes and layouts displayed in the field 71 (step S14). More specifically, the CPU 61 drives the X axis motor 132 and the Y axis motor 134 (refer to FIG. 2) in accordance with the sewing data and moves the embroidery frame 84. The CPU 61 drives the needle bar drive mechanism 32 using the drive shaft motor 122 in concert with the movement of the embroidery frame 84. The CPU 61 sews the patterns on the sewing object C held by the embroidery frame 84, by causing the needle bar 31 on which the sewing needle is mounted to move up and down. The CPU 61 ends the main processing.

In the above-described embodiment, the sewing machine 1 changes a method of identifying the editing target depending on a determination result as to whether the pattern image of one of the plurality of selected patterns is present in the specified position. For example, in the above-described operation (7), when the user has selected the point P3, in a sewing machine of related art, the selected pattern SE4 that is selected last is identified as the editing target. A case will be illustrated in which a user of the sewing machine of the related art selects, as the editing target, the selected pattern SE3 that is arranged inside the mask region R4 of the selected pattern SE4. In this case, the user must temporarily move the selected pattern SE4 to a separate location from the mask region R4. On the other hand, by selecting the point P3, the user of the sewing machine 1 can cause the sewing machine 1 to identify the selected pattern SE3 as the editing target, without moving the selected pattern SE4. In other words, in comparison to the related art, the user can cause the sewing machine 1 to identify the selected pattern as the editing target using an intuitive operation. The sewing machine 1 can improve user convenience when identifying the editing target from among the plurality of selected patterns to be sewn.

More specifically, the sewing machine 1 identifies, on a priority basis, the selected pattern of the pattern image arranged close to the forefront of the screen as the editing target, from among the plurality of pattern images arranged from the forefront of the screen to the rearmost position on the screen on the LCD 7. Since the sewing machine 1 arranges the selected pattern most recently selected in the order closer to the forefront of the screen, the sewing machine 1 can identify the selected pattern most recently selected by the user as the editing target on a priority basis.

The CPU 61 acquires the selected pattern in accordance with the predetermined order from among the plurality of selected patterns, and determines whether the specified position is inside the mask region of the acquired selected pattern (step S24). The CPU 61 provisionally identifies, as the editing target, the selected pattern for which it is determined that the specified position is inside the mask region (step S25). The CPU 61 acquires the selected patterns in order from the provisionally identified selected pattern onward, in the predetermined order. The CPU 61 determines whether the pattern image of the acquired selected pattern is displayed in the specified position. When it is determined that the pattern image is displayed in the specified position, for one among the selected patterns in the predetermined order from the selected pattern provisionally identified as the editing target onward, the CPU 61 identifies, as the editing target, the selected pattern for which the pattern image is displayed in the specified position. When it is determined, that the pattern image is not displayed in the specified position for any of the selected patterns in the predetermined order from the selected pattern provisionally identified as the editing target onward, the CPU 61 identifies the provisionally identified selected pattern as the editing target. The sewing machine 1 can efficiently perform the processing to change the method of identifying the editing target, depending on the determination result as to whether the pattern image of one of the plurality of selected patterns is present in the specified position.

In accordance with the acquisition of the selected pattern, the CPU 61 generates the pattern image (step S4) on the basis of the stitch data that is stored in the pattern storage area 67 of the flash memory 64 and that represents the coordinates of the stitches of the selected pattern. The CPU 61 displays the pattern image generated at step S4 on the LCD 7. The CPU 61 identifies, as the specified position, the predetermined range that includes the particular display position input using the touch panel 8. When the pattern image is generated on the basis of the stitch data, the user easily ascertains the finish when the selected pattern is embroidered. Meanwhile, since the pattern image represents the selected pattern using detailed line segments representing the stitches, there is a case in which the user specifies an area between two stitches that do not have the pattern image. The CPU 61 sets the specified position as the predetermined range that includes the display position input using the touch panel 8. The sewing machine 1 can appropriately identify the editing target even when the pattern image of the selected pattern that is wished to be selected as the editing target is comparatively small, for example.

The CPU 61 calculates the number of stitches in relation to the mask region of the selected pattern (step S33). The CPU 61 identifies the specified position in accordance with the selected pattern. Specifically, when the calculated value K is larger than the threshold value (a first predetermined value), the CPU 61 identifies the specified position for which the first range is the predetermined range, and which corresponds to the selected pattern. When the value K is equal to or less than the threshold value, the CPU 61 identifies the specified position for which the second range that is wider than the first range is the predetermined range, and which corresponds to the selected pattern. When the number of stitches in relation to the mask region is comparatively small, compared to a case in which the number of stitches in relation to the mask region is comparatively large, the possibility is increased that the area specified by the user is the area between the two stitches that do not have the pattern image. When the number of stitches in relation to the mask region is comparatively small, the sewing machine 1 identifies the specified position for which the second range, which is wider than the first range, is the predetermined range. Thus, the user easily selects the selected pattern for which the number of stitches in relation to the mask region is comparatively small as the editing target.

The CPU 61 identifies the specified position in accordance with the selected pattern. Specifically, the CPU 61 identifies the size of the mask region of the selected pattern (step S31). When the identified size of the mask region is larger than the threshold value (a second predetermined value), the specified position is identified for which the first range (a third range) is the predetermined range. When the size of the mask region is equal to or less than the threshold value, the specified position is identified for which the second range (a fourth range) that is wider than the first range is the predetermined range. When the mask region is comparatively small, in comparison to a case in which the mask region is comparatively large, the possibility is increased that the area specified by the user is the area that does not have the pattern image representing the stitches of the selected pattern. Specifically, when the pattern image is comparatively small, in comparison to a case in which the pattern image is comparatively large, it is more difficult for the user to specify the area that has the pattern image representing the stitches of the selected pattern. Since the sewing machine 1 sets the predetermined range in accordance with the size of the mask region, the user easily selects the selected pattern with the comparatively small size as the editing target.

Figure 8:
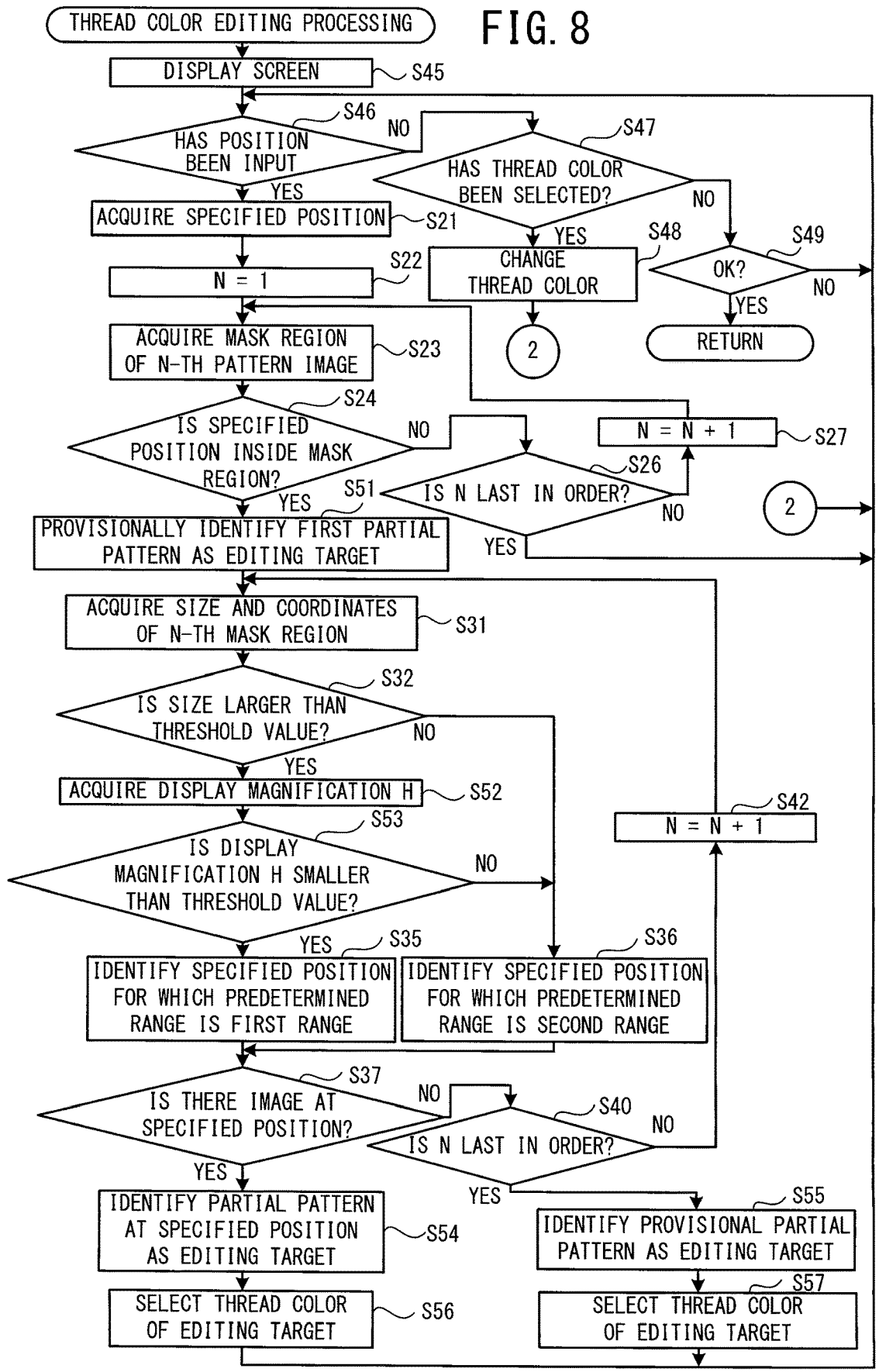
FIG. 8 is a flowchart of thread color editing processing performed in main processing of a second embodiment.

Main processing according to a second embodiment will be explained. The main processing of the second embodiment changes the method of identifying the editing target in accordance with the editing content. More specifically, in an embroidery pattern that is sewn using threads of a plurality of colors, the sewing machine 1 changes the thread color for each of partial patterns that correspond to the thread color. The embroidery pattern is configured by the partial patterns. In the main processing of the second embodiment, the processing at step S11 when the key K6 has been selected is different from the first embodiment. An explanation is omitted of the processing that is the same as that of the first embodiment. A case will be illustrated in which, in the main processing of the second embodiment, the key K6 is selected and the processing at step S11 is performed. When a particular position in the field 71 is specified, thread color editing processing shown in FIG. 8 is activated. In the thread color editing processing shown in FIG. 8, the same step numbers are allocated to the processing that is the same as the editing target identification processing shown in FIG. 6. The processing shown in FIG. 6 and the processing shown in FIG. 8 differ in that step S45 to step S49 is performed, processing at step S51 is performed instead of the processing at step S25, processing at step S52 and step S53 is performed instead of the processing at step S33 and step S34, processing at step S54 and step S56 is performed instead of the processing at step S38 and step S39, and processing at step S55 and step S57 is performed instead of the processing at step S43 and step S44.

As an example, a case will be explained in which, after an embroidery pattern E6, which is to be sewn using threads of 10 colors, has been selected twice as the selected pattern, the key K6 and a point P4 are selected. Similarly to the main processing of the first embodiment, the main processing of the second embodiment is performed when the user has input the command to start the selection and editing of the embroidery pattern that is to be sewn. When the CPU 61 detects the command, the CPU 61 reads out the main program stored in the program storage area of the ROM 62 and stores the main program in the RAM 63. The CPU 61 performs the following steps, in accordance with the instructions included in the main program stored in the RAM 63. The various parameters, such as threshold values and the like, needed to perform the main processing are stored in the flash memory 64. The various data obtained in the course of the main processing is stored as necessary in the RAM 63.

Figure 9:
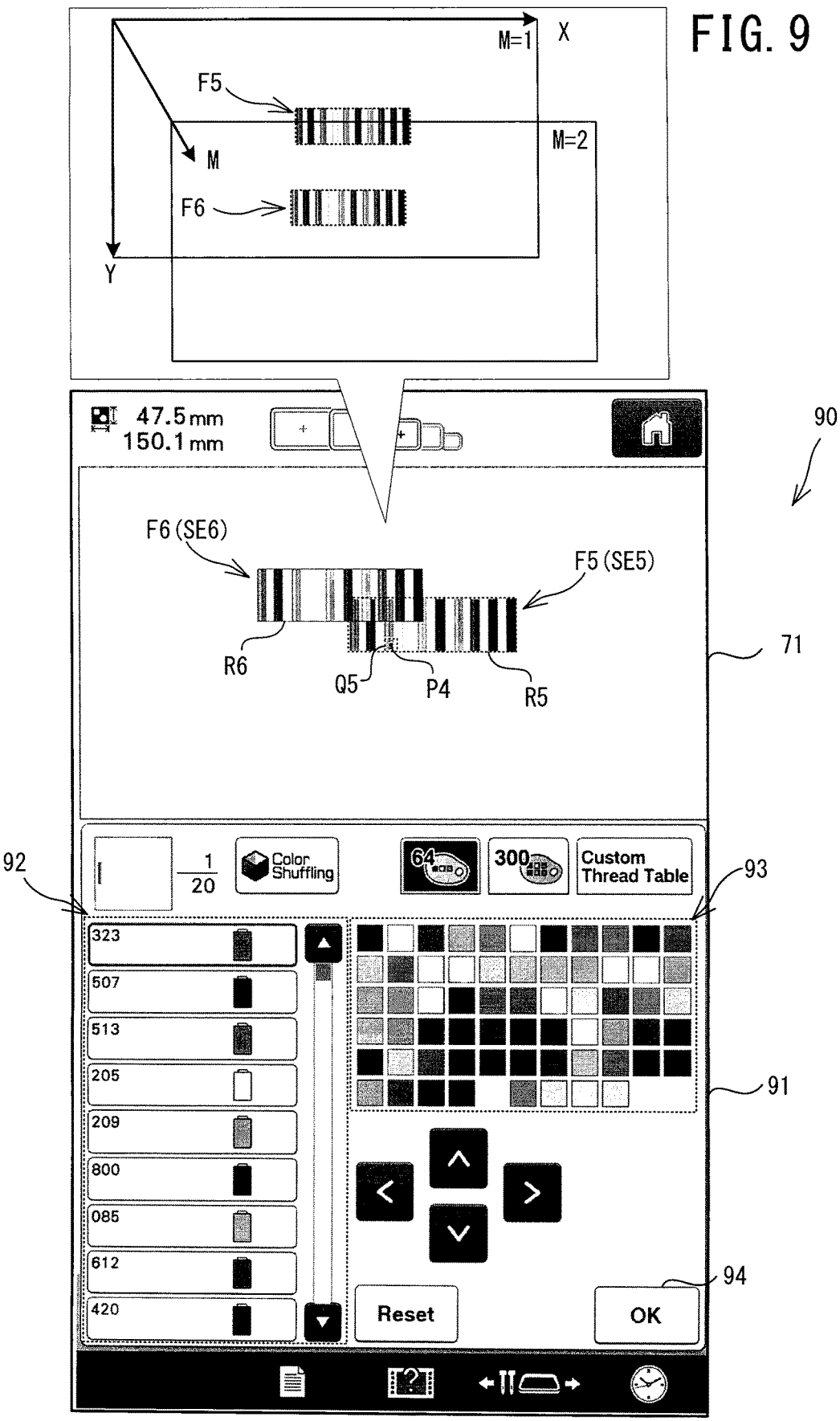
FIG. 9 is an explanatory diagram of a screen displayed on the liquid crystal display, and an order of display of selected patterns.

When it is detected at step S9 of the main processing that the user has selected the key K6 (yes at step S9), as shown in FIG. 8, the CPU 61 displays a screen 90 shown in FIG. 9 on the LCD 7 (step S45). As shown in FIG. 9, the screen 90 includes the field 71, and a field 91. Similarly to the screen 70, the field 71 displays the selected patterns. In FIG. 9, a selected pattern SE5 and the selected pattern SE6 are displayed in the field 71. The field 91 includes a field 92, a field 93, and a key 94. In the field 92, the colors of threads used to sew the selected patterns displayed in the field 71 are displayed in a sewing order. The field 93 displays, in color, the thread colors that can be changed. The key 94 is a key used to input a command to end processing to edit the thread colors.

The CPU 61 determines whether the selection of the particular position inside the field 71 has been detected (step S46). When it is detected that the point P4 inside the field 71 has been selected by the user (yes at step S46), the CPU 61 acquires the position of the point P4 inside the field 71 (step S21), and sets the variable N to 1 (step S22). The CPU 61 identifies a mask region R6 of a pattern image F6 of the selected pattern SE6 that is first in the call order (step S23). The CPU 61 determines that the point P4 is not inside the mask region R6 acquired at step S23 (no at step S24), and increments the variable N (no at step S26; step S27). The CPU 61 identifies a mask region R5 of a pattern image F5 of the selected pattern SE5 that is second in the call order (step S23). The CPU 61 determines that the point P4 is inside the mask region R5 (yes at step S24), and provisionally identifies, as the editing target, the partial pattern that is first in the sewing order, from among the 10 partial patterns included in the selected pattern SE5 (step S51). The CPU 61 acquires the size and coordinates of the mask region R5 of the pattern image F5 (step S31), and determines that the size of the mask region R5 is larger than the threshold value (yes at step S32). The CPU 61 acquires a display magnification H (step S52). The display magnification H is a display magnification of the pattern image on the LCD 7. Using known processing that is not shown in the drawings, the display magnification of the selected pattern displayed in the field 71 is changed in accordance with a command input using the key 81 shown in FIG. 4, and the display magnification after the change is stored in the RAM 63. The CPU 61 refers to the RAM 63, and acquires the display magnification H. The CPU 61 determines whether the display magnification H acquired at step S52 is smaller than a threshold value (step S53). The threshold value is set in advance while taking into account the size of the field 71 that displays the pattern image, the size of the embroidery frame 84 (the sewable area) that is to be used, the resolution of the LCD 7, the length of the stitches and the like. The threshold value is stored in the flash memory 64, for example. When the display magnification H is equal to or greater than the threshold value (no at step S53), the CPU 61 identifies the specified position for which the second range is the predetermined range (step S36). When it is determined that the display magnification H is smaller than the threshold value (yes at step S53), the CPU 61 identifies a specified position Q5 for which the first range is the predetermined range (step S35).

The CPU 61 determines that an image representing stitches of the partial pattern that is third in the sewing order is present at the specified position Q5 identified at step S35 (yes at step S37). The CPU 61 identifies, as the editing target, the third partial pattern that has the stitches at the specified position Q5 (step S54). The CPU 61 selects, in the field 92, the thread color corresponding to the editing target identified at step S54 (step S56). When the pattern image is not present at the specified position (no at step S37), when the variable N is not the last in the call order (no at step S40), the CPU 61 increments the variable N (step S42) and the returns the processing to step S31. When the variable N is the last in the call order (yes at step S40), the CPU 61 identifies, as the editing target, the partial pattern provisionally identified at step S51 (step S55). The CPU 61 selects, in the field 92, the thread color corresponding to the editing target identified at step S55 (step S57). After the processing at step S56 or step S57, the CPU 61 returns the processing to step S46.

When it is not detected that the position has been selected inside the field 71 (no at step S46), the CPU 61 determines whether the selection of one of the thread colors that can be changed in the field 93 has been detected (step S47). When the selection of one of the thread colors displayed in the field 93 has been detected (yes at step S47), the CPU 61 changes the thread color of the editing target to the selected thread color, and changes the thread color data on the basis of the thread color after the change (step S48). The CPU 61 changes the thread color of the partial pattern of the editing target displayed on the LCD 7 to the thread color after the change. The CPU 61 returns the processing to step S46. When the selection of one of the thread colors that can be changed in the field 93 has not been detected (no at step S47), the CPU 61 determines whether the selection of the key 94 has been detected. When the selection of the key 94 has not been detected (no at step S49), the CPU 61 returns the processing to step S46. When the selection of the key 94 has been detected (yes at step S49), the CPU 61 displays the screen 80 shown in FIG. 4 on the LCD 7, ends the thread color editing processing, and returns the processing to the main processing shown in FIG. 3.

The sewing machine 1 identifies, as the specified position, the predetermined range whose size accords with the display magnification when the pattern image is displayed on the LCD 7, and which includes the display position input using the touch panel 8 (step S53, step S35, step S36). According to the sewing machine 1, the size of the predetermined range is set in accordance with the display magnification of the pattern image, and thus the user easily selects the desired pattern as the editing target, even when the display magnification of the pattern image has changed.

The selected pattern is sometimes the pattern that is sewn using the thread of the plurality of colors and includes the plurality of partial patterns corresponding to each of the plurality of colors. When it is determined that the image representing the stitches is displayed at the specified position, the CPU 61 identifies, as the editing target, the partial pattern for which the pattern image is displayed at the specified position, from among the plurality of partial patterns for each of the plurality of selected patterns. When it is determined that the image representing the stitches is not displayed at the specified position, the CPU 61 identifies, as the editing target, the partial pattern that is first in the sewing order among the selected patterns, for which, in the display position, the mask region is set that encompasses the selected pattern. The CPU 61 changes the color of the thread of the identified editing target. In a state in which the pattern images for each of the plurality of selected patterns are displayed on the LCD 7, when the user changes the thread color of the partial pattern included in the identified selected pattern, there is a case in which it is difficult for the CPU 61 to identify the thread color of the partial pattern that is to be the editing target. Even in the state in which the pattern images for each of the plurality of selected patterns are displayed on the LCD 7, the sewing machine 1 can identify, as the editing target, the partial pattern that has the pattern image at the specified position, or the partial pattern that is first in the sewing order among the selected patterns for which the mask region is set at the specified position. Thus, the sewing machine 1 can improve the user convenience when changing the color of the thread in the plurality of selected patterns.

The sewing machine 1 displays the thread colors of the partial patterns in the sewing order in the field 92. When the thread color is changed, the user selects the thread color of the partial pattern that is the target of the change, and selects the color after the change. When there is the plurality of selected patterns, it is difficult for the user to identify which of the thread colors corresponds to which of the partial patterns of the selected patterns, even when looking at the thread colors. The sewing machine 1 can appropriately select the editing target by selecting the field 71, even when it is not possible to identify the partial pattern from the field 92. Even when the image representing the stitches is not present at the specified position, if it is determined to be inside the mask region, the partial pattern that is first in the sewing order among the selected patterns is identified as the editing target. Thus, the user can easily identify the selected pattern for which the thread color is wished to be changed. The selected pattern including the partial pattern for which the thread color is to be changed is identified from among the plurality of selected patterns, and thus, the user easily identifies the partial pattern from the identified selected pattern.

The sewing machine and the medium storing the sewing data editing program are not limited to the above-described embodiments, and various modifications may be added insofar as they do not depart from the spirit and scope of the present disclosure. For example, the following modifications (A) to (C) may be added as appropriate.

(A) It is sufficient that the sewing machine 1 be a sewing machine provided with one or more needle bar, and a number and arrangement of the needle bars may be changed. It is sufficient that the sewing machine 1 be a sewing machine in which a sewing object can be conveyed by a feed dog, and the sewing machine 1 need not necessarily be provided with the embroidery frame movement mechanism 11. In addition to being a household sewing machine, the sewing machine 1 may be an industrial sewing machine. The sewing data editing program may be installed in and operated on a sewing data editing device other than the sewing machine 1 that is not provided with a sewing mechanism. For example, the sewing data editing device may be a dedicated device, a personal computer (PC), a tablet PC, a smartphone, or the like. It is sufficient that a storage portion be capable of storing information, and may be another storage device, such as the ROM 62, the flash memory 64, an HDD, an SDD or the like. In addition to the touch panel 8, an input portion may be a keyboard, a mouse, a joystick, or the like. It is sufficient that a display portion be capable of displaying an image and may be, for example, the LCD 7, an organic EL display, a plasma display, a plasma tube array display, or an electronic paper display that uses electrophoresis, and the like.

(B) The program that performs the main processing shown in FIG. 3 may be stored in a storage device of the sewing machine 1 until the sewing machine 1 executes the program. Thus, an acquisition method of the program, an acquisition route, and a device storing the program may each be changed as appropriate. The program that is executed by a processor of the sewing machine 1 may be received from another device via a cable or wireless communication, and may be stored in a storage device. Examples of the other device include a PC and a server connected via a network.

(C) The respective steps of the main processing shown in FIG. 3 are not limited to the example in which they are performed by the CPU 61, and a part or all of the steps may be performed by another electronic device (an ASIC, for example). The respective steps of the above-described processing may be performed through distributed processing by a plurality of electronic devices (a plurality of CPUs, for example). The respective steps of the processing of the above-described embodiment shown in FIG. 3 can be changed in order, omitted or added, as necessary. A case in which an operating system (OS) or the like operating on the sewing machine 1 realizes a part or all of the functions of the above-described embodiments by the processing thereof on the basis of a command from the CPU 61 of the sewing machine 1 is also included in the scope of the present disclosure. For example, the following modifications from (C-1) to (C-3) may be added to the main processing, as appropriate.

(C-1) The plurality of embroidery patterns may be stored in a storage portion (a ROM, an HDD, an SSD, a memory card, or an external storage device, for example,) other than the flash memory 64. The processing at step S5 may be changed as appropriate. For example, the pattern storage area 67 of the flash memory 64 may store thumbnail images representing the embroidery patterns. The thumbnail images may be associated with the sewing data. The sewing machine 1 may display the thumbnail image on the LCD 7 when the selected pattern is acquired. In this case, the processing at step S4 may be omitted. The sewing machine 1 may be configured such that a plurality of embroidery patterns may be selectable as the selected patterns using a single operation. The initial layout and size of the selected pattern may be changed as appropriate. The selected pattern that is newly selected need not necessarily be identified as the editing target.

(C-2) The method of inputting the specified position may be changed depending on the input portion. For example, when the input portion is the mouse, a position specified by a pointer when the mouse is clicked may be the particular position. The method of identifying the specified position may be changed as appropriate. The sewing machine 1 distinguishes between the specified position when the editing target is provisionally identified and the specified position when the editing target is identified but they may be the same. For example, the processing from step S32 to step S36 may be performed between the processing at step S23 and the processing at step S24, and it may be determined, at step S24, whether the specified position identified at step S35 or step S36 is inside the mask region identified at step S23. The shape and method of setting the mask region may be changed as appropriate. The content and method of editing the editing target may be changed as appropriate. The predetermined order when identifying the editing target may be changed as appropriate. The predetermined order need not necessarily have a correlation with the display order. The sewing machine 1 need not necessarily cause the range indicating the specified position to be the different range depending on the value K. In other words, the first range and the second range may be the same. The sewing machine 1 need not necessarily cause the range indicating the specified position to have a different value depending on the size of the mask region. In other words, the third range and the fourth range may be the same value. The sewing machine 1 need not necessarily cause the range indicating the specified position to have a different value depending on the display magnification of the pattern image on the LCD 7. The sewing machine 1 may set the predetermined range determined on the basis of the value K, the predetermined range set on the basis of the size of the mask region, and the predetermined range set depending on the display magnification of the pattern image to be the same, or may set these ranges to have different values.

When the range indicating the specified position is changed depending on the display magnification of the pattern image, the size of the predetermined range may be set in a stepped manner in accordance with the display magnification. For example, when the pattern image is displayed on the LCD 7 under conditions of a comparatively large display magnification, gaps can occur between the line segments representing the stitches on the pattern image, and there is a case in which the user does not easily select a point on the stitches of the selected pattern. In this type of case, for example, when the display magnification is a display magnification at which one dot represents an actual dimension of 0.5 mm, the predetermined range may be 5 dots, similarly to the first range. When the display magnification is a display magnification at which one dot represents an actual dimension of 0.25 mm, the predetermined range may be 9 dots (widened in 4-dot increments in the up-down and left-right directions), which is wider than the first range. The first range, the second range, the third range, the fourth range, the first predetermined value, and the second predetermined value may be changed as appropriate. In the editing target identification processing of the first embodiment (refer to FIG. 6), the processing at step S32 may be omitted and the specified position may be identified solely on the basis of the determination result of the processing at step S34. The processing at step S33 and step S34 may be omitted and the specified position may be identified solely on the basis of the determination result of the processing at step S32. In the editing target identification processing of the first embodiment, the specified position may be identified on the basis of processing that is the same as the processing at step S52 an step S53 (refer to FIG. 8). Similarly, in the thread color editing processing (refer to FIG. 8) of the second embodiment, the processing at step S32 may be omitted and the specified position may be identified solely on the basis of the determination result of the processing at step S53. The processing at step S52 and step S53 may be omitted and the specified position may be identified solely on the basis of the determination result of the processing at step S32. In the thread color editing processing of the second embodiment, the specified position may be identified on the basis of processing that is the same as the processing at step S33 and step S34 (refer to FIG. 6). The specified position may be the same size range regardless of the size of the mask region, the display magnification, and the value K, and a configuration may be adopted in which the relative position of the predetermined range with respect to the display position, and the size and shape of the predetermined range can be set by the user.

(C-3) The sewing machine 1 need not necessarily provisionally identify the editing target. In this case, for example, the sewing machine 1 may perform the processing from step S31 to step S42 after step S22, and when the variable N is the last at step S40 (yes at step S40), the sewing machine 1 may perform the processing from step S22 to step S27, and, at step S25, may identify the N-th selected pattern as the editing target. When this type of processing is performed, when the variable N is the last at step S40, the CPU 61 returns the variable N to 1, and performs the processing from step S22 to step S27. As a result, more time is required than in the above-described embodiments. However, the same identification result as the above-described embodiments is obtained. In the second embodiment, when the plurality of partial patterns are inside the specified position, the partial pattern arranged closest to the forefront of the screen may be identified as the editing target on a priority basis, or each of the plurality of partial patterns having stitches inside the specified position may be identified as the editing target.

The apparatus and methods described above with reference to the various embodiments are merely examples. It goes without saying that they are not confined to the depicted embodiments. While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:
1. A sewing machine comprising:
   a display portion configured to display an image;
   an input portion configured to input an instruction to select a particular specified position on the display portion;
   a processor; and
   a memory configured to store computer-readable instructions that, when executed by the processor, instruct the processor to perform processes comprising:
      acquiring a selected pattern that is selected from among a plurality of embroidery patterns;
      displaying, on the display portion, a pattern image representing the selected pattern;
      identifying the specified position indicated by the instruction when the instruction is input by the input portion;
      determining, when a plurality of the pattern images are displayed on the display portion, whether one of the plurality of the pattern images is displayed at the identified specified position;

when it is determined that the pattern image is displayed at the identified specified position, identifying the selected pattern for which the pattern image is displayed at the specified position as an editing target from among the plurality of selected patterns, and, when it is not determined that the pattern image is displayed at the identified specified position, identifying the selected pattern for which a mask region encompassing the selected pattern is set at the specified position as the editing target; and editing the identified editing target.

2. The sewing machine according to claim 1, wherein the identifying of the editing target includes identifying, among the plurality of pattern images arranged in order from a forefront to a rearmost position of the display portion, the selected pattern of the pattern image arranged closest to the forefront as the editing target on a priority basis.

3. The sewing machine according to claim 1, wherein the computer-readable instructions further instruct the processor to perform processes comprising:

acquiring the selected pattern in accordance with a predetermined order, from among the plurality of selected patterns;

determining whether the specified position is inside the mask region of the acquired selected pattern; and provisionally identifying the selected pattern as the editing target when it is determined that the specified position is inside the mask region, the determining whether the pattern image is displayed at the identified specified position includes acquiring, in order, the selected pattern from the provisionally identified selected pattern onward, in the predetermined order, and determining whether the pattern image of the acquired selected pattern is displayed at the specified position, and the identifying the editing target includes identifying, as the editing target, the selected pattern for which the pattern image is displayed at the specified position when it is determined that the pattern image, representing any one of the selected patterns in the order from the provisionally identified selected pattern onward in the predetermined order, is displayed at the specified position, and identifying the provisionally identified selected pattern as the editing target, when it is not determined that the pattern image, representing at least one of the selected patterns in the order from the provisionally identified selected pattern onward in the predetermined order, is displayed at the specified position.

4. The sewing machine according to claim 1, wherein the identifying of the specified position includes identifying, as the specified position, a position inside a predetermined range including a particular display position that is instructed by the input portion.

5. The sewing machine according to claim 4, wherein the computer-readable instructions further instruct the processor to perform a process comprising:

calculating a number of stitches in relation to the mask region of the selected pattern, and the identifying of the specified position includes identifying the specified position for which the predetermined range is a first range when the calculated number of stitches is larger than a first predetermined value, and identifying the specified position for which the predetermined range is a second range that is wider than the first range when the number of stitches is equal to or less than the first predetermined value.

6. The sewing machine according to claim 5, wherein the computer-readable instructions further instruct the processor to perform a process comprising:

identifying a display magnification on the display portion of the pattern image of the selected pattern, and the identifying of the specified position includes identifying, as the specified position, the predetermined range of a size corresponding to the display magnification.

7. The sewing machine according to claim 4 wherein the computer-readable instructions further instruct the processor to perform processes comprising:

identifying a size of the mask region of the selected pattern, and the identifying of the specified position includes identifying the specified position for which the predetermined range is a third range when the identified size of the mask region is larger than a second predetermined value, and identifying the specified position for which the predetermined range is a fourth range that is wider than the third range when the size of the mask region is equal to or smaller than the second predetermined value.

8. The sewing machine according to claim 7, wherein the computer-readable instructions further instruct the processor to perform a process comprising:

identifying a display magnification on the display portion of the pattern image of the selected pattern, and the identifying of the specified position includes identifying, as the specified position, the predetermined range of a size corresponding to the display magnification.

9. The sewing machine according to claim 1, wherein the selected pattern is a pattern sewn using threads of a plurality of colors, and includes a plurality of partial patterns corresponding to each of the plurality of colors, the identifying of the editing target includes identifying, as the editing target, a partial pattern displayed at the specified position that is included in the selected pattern for which the pattern image is displayed at the specified position, when it is determined that one of the plurality of pattern images is displayed at the identified specified position, and identifying, as the editing target, a partial pattern that is first in a sewing order, of the selected pattern for which a mask region encompassing the selected pattern is set at the specified position, when it is not determined that at least one of the plurality of pattern images is displayed at the identified specified position, and the editing of the editing target includes changing the color of the thread of the identified editing target.

10. A non-transitory computer-readable medium storing computer-readable instructions that are executed by a processor provided in a sewing machine, the computer-readable instructions performing processes comprising:

acquiring a selected pattern that is selected from among a plurality of embroidery patterns;

displaying, on a display portion, a pattern image representing the selected pattern;

identifying, when an instruction is input by the input portion to select a particular specified position on the display portion, the specified position indicated by the instruction;

determining, when a plurality of the pattern images are displayed on the display portion, whether one of the plurality of the pattern images is displayed at the identified specified position;

when it is determined that the pattern image is displayed at the identified specified position, identifying the selected pattern for which the pattern image is displayed at the specified position as an editing target from among the plurality of selected patterns, and, when it is not determined that the pattern image is displayed at the identified specified position, identifying the selected pattern for which a mask region encompassing the selected pattern is set at the specified position as the editing target; and editing the identified editing target.

* * * * *